(No Model.)
J. D. THOMAS.
SLED PROPELLER.
No. 410,220. Patented Sept. 3, 1889.
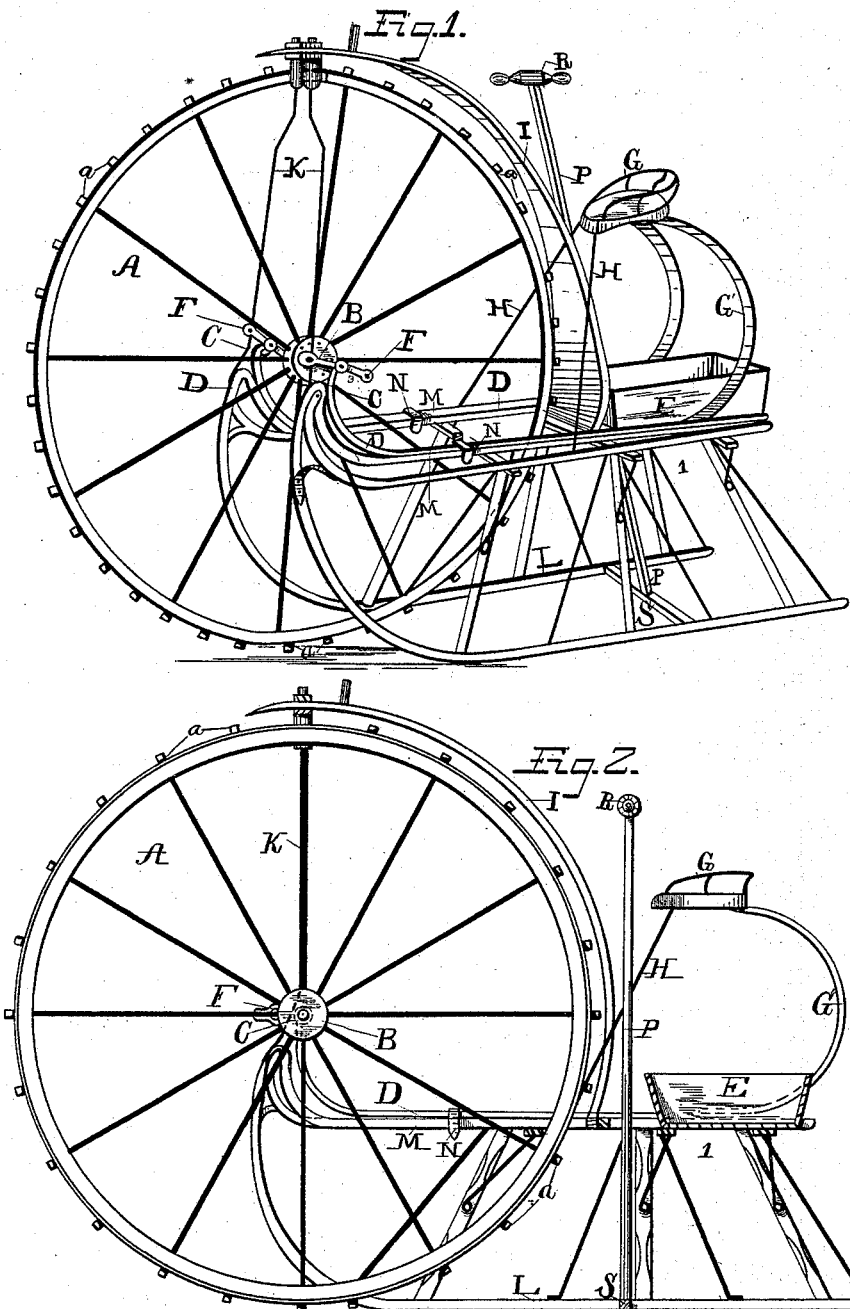
Witnesses.
John B. Johns
Wm. H. Brereton
Inventor.
John D. Thomas
Attorney.
S. H. Tallmadge

UNITED STATES PATENT OFFICE.

JOHN D. THOMAS, OF PETOSKEY, MICHIGAN, ASSIGNOR OF ONE-HALF TO AMOS H. TYLER, OF SAME PLACE.

SLED-PROPELLER.

SPECIFICATION forming part of Letters Patent No. 410,220, dated September 3, 1889.

Application filed October 9, 1888. Serial No. 287,594. (No model.)

*To all whom it may concern:*

Be it known that I, JOHN D. THOMAS, of Petoskey, in the county of Emmet and State of Michigan, have invented a new and useful Mode of Propelling Sleighs on Snow Roads and on Ice; and I do hereby declare that the following is a full, clear, and exact description of the construction and operation of the same.

This invention relates to certain improvements in that class of sled-propellers which are operated by foot-power. Heretofore, so far as I am aware, such propellers have rendered necessary a sled of peculiar construction; and it is the object of my invention to provide a propeller which may be readily attached to an ordinary sled without complicated and expensive appliances.

The above-mentioned object I attain by the means illustrated in the accompanying drawings, in which—

Figure 1 represents a perspective view of my improved propeller applied to a sled, and Fig. 2 a longitudinal sectional view thereof.

The letter A indicates a propeller-wheel having a series of projections $a$ on its periphery to prevent slipping. The said wheel is provided with a shaft B, which is journaled in bearings C at the upturned forward end D' of the spring-arms D, extending forward from the box or body E, which may form a receptacle for various purposes. The ends of the axle B are provided with cranks and pedals F, by means of which the wheel may be operated by foot-power.

G indicates a seat, which is mounted on spring-standards G', secured to the top rails of the sled by means of bolts or otherwise, and braced thereto by means of the rods H.

I indicates a shield, extending over the rear of the wheel to protect the occupant of the sled from snow, slush, or mud thrown up by the wheel. The said shield at its rear is secured to the arms D, and at its forward ends to the brace-rods K, which are secured at their lower ends to the upper part of the knees of the sled when the propeller is secured thereto.

The letter L indicates the sled, which may be of the ordinary or any approved construction. The arms D of the propeller, when in place, are set upon the upper rails M of the sled, and are secured thereto by means of clips N, so that the propeller may be readily attached and detached when required; but it is evident that other means of attachment may be employed without departing from my invention.

The letter P indicates a brake-lever, which is provided at its upper end with a cross-head R, forming handles which are under the control of the occupant of the seat. The said lever passes obliquely through an opening in the body of the propeller, where it is fulcrumed, and at its lower end is provided with a transverse brake bar or shoe S, which can be brought to the ground with more or less force by manipulating the lever to control the movement of the sled.

As constructed, it will be seen that the body E and arms D form a strong and substantial frame, whereon the shaft of the propeller-wheel is journaled, and which can be readily attached to a sled of ordinary construction, the bearings for the shaft falling just behind the knees of the sled, so as to be in the most convenient position for drawing it forward when in operation. As before stated, the arms D of the frame are removably secured to the top rail of the sled by clips N, and the forward ends, as at D', are bent upward and terminate in a bearing C for the crank-axle B of the propeller-wheel A. These arms are made of spring material, so as to form an elastic or yielding connection between the propeller-wheel and sled. Any irregular movement of the wheel will not, therefore, be imparted to the sled.

Having thus described my invention, what I claim, and desire to secure by Letters Patent, is—

1. The combination, with a sled, of the propeller-frame consisting of the arms D, removably secured upon the upper rails of the sled, and having upturned forward spring ends D' terminating in bearings C, and propeller-wheel A $a$, having crank-axle B journaled in said bearings C of the spring-arms D', as described, for the purposes specified.

2. The combination, with the frame of the propeller, of the shield attached to and forming part thereof, and the brace-rods adapted to be secured to the knees of the sled to support the forward end of the shield over the wheel, substantially as specified.

3. The combination, in a sled-propeller, with the sled and arms D, removably secured upon the top rail of the sled and having the forward upturned spring-arms D′ terminating in bearings C, of the body E, seat G, supported upon spring-standards G′, propeller-wheel A $a$, having crank-axle B journaled in the ends of the spring-arms D′, and brake-lever P, with cross-head R, all constructed and arranged to operate as described, for the purposes specified.

JOHN D. THOMAS.

In presence of—
M. N. GEORGE,
R. C. DART.